United States Patent
Travis

(10) Patent No.: US 6,585,108 B2
(45) Date of Patent: Jul. 1, 2003

(54) METHOD AND APPARATUS FOR MONITORING AND CONTROLLING CONVEYOR POSITION

(76) Inventor: Tonny A. Travis, P.O. Box 217, Prosperity, WV (US) 25909

( * ) Notice: Subject to any disclaimer, the term of this patent is extended or adjusted under 35 U.S.C. 154(b) by 0 days.

(21) Appl. No.: 09/953,708

(22) Filed: Sep. 17, 2001

(65) Prior Publication Data

US 2003/0051979 A1 Mar. 20, 2003

(51) Int. Cl.$^7$ .............................................. B65G 43/00
(52) U.S. Cl. ............................ 198/810.02; 198/810.01
(58) Field of Search ...................... 198/810.01, 810.02, 198/810.03, 810.04

(56) References Cited

U.S. PATENT DOCUMENTS

| | | | | |
|---|---|---|---|---|
| 3,742,477 A | * | 6/1973 | Enabnit ...................... 340/259 |
| 3,922,661 A | * | 11/1975 | Enabnit et al. ............. 340/259 |
| 4,106,005 A | * | 8/1978 | Asakawa .................... 198/856 |
| 4,437,563 A | * | 3/1984 | Oriol .......................... 198/810 |
| 4,469,993 A | * | 9/1984 | Swanson et al. ............ 198/859 |
| 5,096,044 A | * | 3/1992 | Biebel ........................ 198/810 |
| 5,168,266 A | * | 12/1992 | Fukuda ...................... 198/810 |
| 5,295,571 A | * | 3/1994 | Van Den Bogaert et al. .......................... 198/810 |
| 5,957,263 A | * | 9/1999 | Espenschied .......... 198/810.01 |
| 6,047,814 A | * | 4/2000 | Alles et al. ............. 198/810.02 |
| 6,126,512 A | * | 10/2000 | Chao et al. ............. 198/810.03 |
| 6,131,727 A | * | 10/2000 | Nelson ................... 198/810.02 |
| 6,291,991 B1 | * | 9/2001 | Schnell ....................... 324/235 |

* cited by examiner

*Primary Examiner*—Douglas Hess

(57) ABSTRACT

The method for facilitating the maintenance of a conveyor structure having a long and heavy duty moving conveyor belt mounted on rollers which are mounted on a base, wherein the belt is driven by a drive motor, said method having the steps of establishing one or more stationary zero set points on the structure, providing one or more cycle points on the belt, each cycle point marking the terminus of a designated travel distance of the belt, providing a counter on the structure for measuring the distance traveled by any of the cycle points on the belt beyond one or more designated set points, providing one or more work stations along and in proximity to the belt, and providing a reset device for resetting the counter to a desired starting value when a designated cycle point arrives at a designated set point, spotting one or more event sites on the belt, transmitting a signal to a computer that an event site has been spotted, the computer being provided with data sufficient to determine the distance which the spotted event site must travel to a forward work station, and operating the computer either to signal an operator to control, or to itself control an aspect of the operation of the conveyor structure for enhancing the maintenance of the belt.

7 Claims, 4 Drawing Sheets

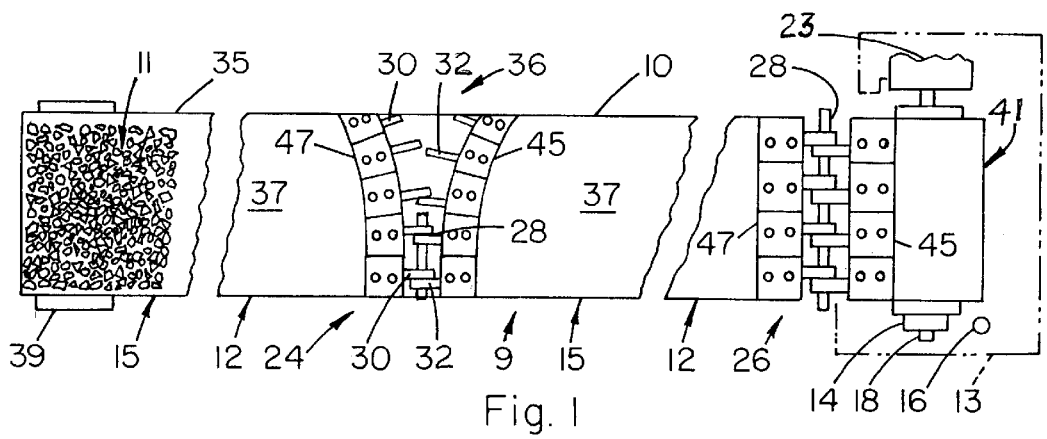
Fig. 1
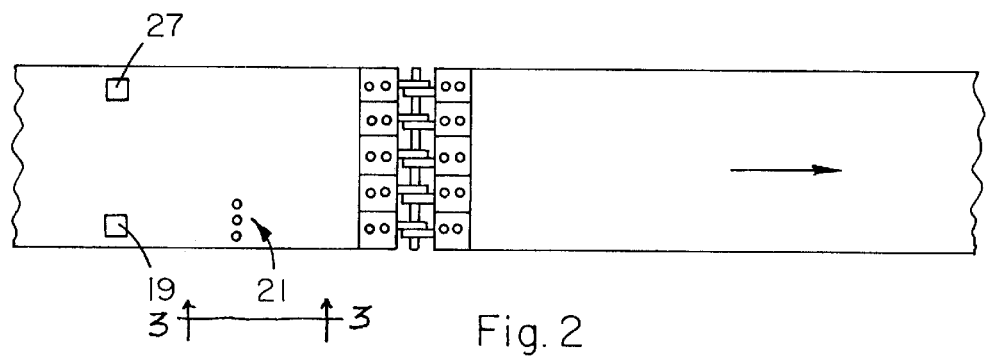
Fig. 2
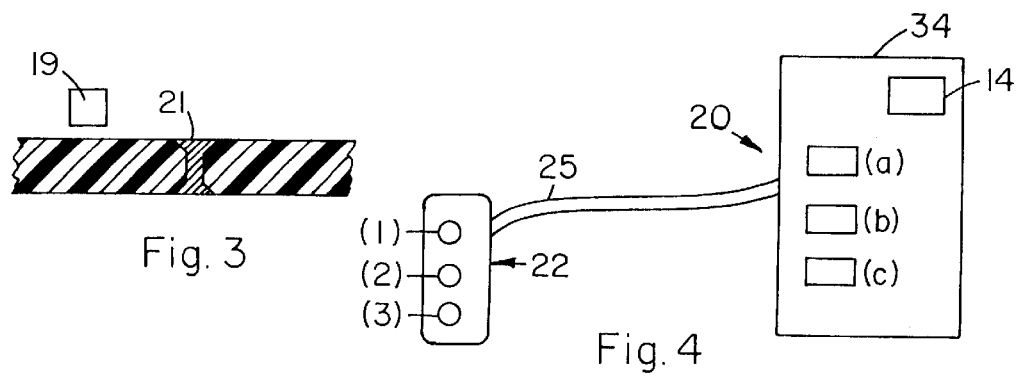
Fig. 3
Fig. 4
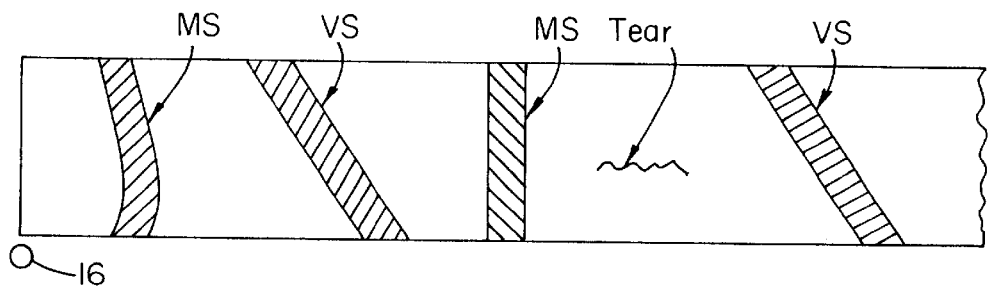
Fig. 5

Conveyor Layout with Remote Drive & Roof Mounted Discharge

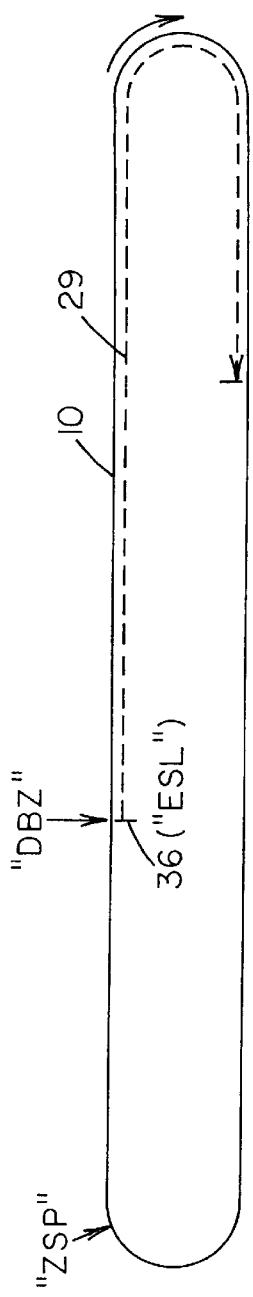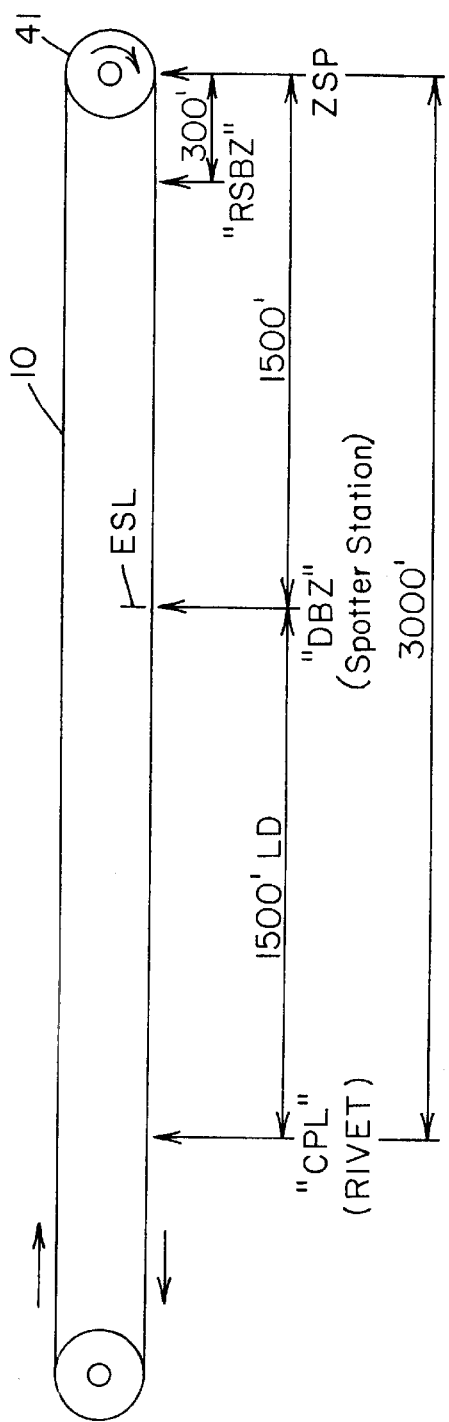

METHOD AND APPARATUS FOR MONITORING AND CONTROLLING CONVEYOR POSITION

BACKGROUND OF THE INVENTION

Field: Conveyor system transport equipment such as belts, chains, cable, and rope, particularly conveyor belts of the lengthy and endless type used to transport material such as coal, minerals, products or the like over long distances typically comprise a drive roller means, a tail roller means, and a belt means, typically in 500-1000 ft., sections for long heavy duty belts, with their ends connected (spliced) to make the belt endless. Such belts are used to convey thousands of tons of material or product per hour. These belts range from one or two feet in width up to seven feet or more in width and are up to three or more miles in total length with several sections of belt spliced end to end with riveted metal splices or cured rubber splices, or other such means.

Coal mines and quarries, for example, typically use long, wide conveyors that carry thousands of tons of material at one lap of the belt. Obviously, proper maintenance of these belts is critical to maintain desired production rates and to limit conveyor downtime, which can be several hours for severely damaged or separated belts. In the use of such long belts, damage areas such as rips, tears, holes, broken metal splices, partially torn apart splices and the like often occur and must be repaired quickly if a complete breakage and separation of the belt is to be avoided, and if an economical transport or production rate of the conveyor is to be maintained or restored.

In this regard, and as shown in FIG. 6, the present invention provides an application relating to conveyor belt scrapers. In underground coal mines, for example, belt scrapers are installed, typically at belt discharge points, to scrape material from the belt to prevent its being carried back on the return belt section. These scrapers are made in many different structural compositions, designs and configurations, however, because of federal laws and the labor required to clean up "carry back", belt scrapers with tungsten carbide blades are widely used. These scrapers are installed to scrape the belt with heavy pressure and because of this the scrapers do a lot of damage to the mechanical and vulcanized splices as well as the mechanical splices themselves damaging the scrapers. With the present invention it is possible to know when a splice is coming to a scraper and then to lessen the pressure on the scraper to prevent or minimize damage to a splice and to the scraper.

As further background, such long coal mine conveyor belts, being made of stretchable material such as polymer or steel belt or steel cable reinforced tire cord, must be placed under very heavy tension between the drive roller means and the tail roller means by, e.g., hydraulic tensioning apparatus in order to provide an adequately deformation resistant support surface and to prevent belt slippage on the drive roller means. As a consequence, for example, when a damaged splice is to be repaired and requires the belt section to be separated at the splice, the aforesaid tension must be removed which can shrink the length of the belt by several feet. Heavy clamping and other equipment must therefore be used to support and hold the adjacent ends of the belt sections into a precise position against the shrinkage forces such that the splice can either be repaired or replaced. A very convenient location for a repair station is in proximity to the accessible drive end of the conveyor.

The above described damage areas which may not have resulted in a complete separation of the belt, are primarily what the present invention is directed to. It is noted that for the worst scenarios such as a complete breakage and separation of the belt deep within the mine, the repair station with all of its heavy attendant equipment necessary to pull the untensioned and shrunken belt back together to make a new splice, would have to be transported to the break site. It is noted that in describing herein the various applications of the present invention, the term "event site" is used to indicate undamaged splices, damaged splices, splices about to arrive at a scraper station, tears, rips, bulges, or the like in the belt, or any other site on or in the belt which may need instant or future attention from maintenance crews.

Prior Art: Heretofore, the detection of an event site, visually or otherwise, often has been only the first step in a very time consuming process for bringing the site to a location where, e.g., repair of belt tear damage is feasible. For example, in long coal mines where the conveyor extends many thousands of feet, e.g., 3,000 or more, in low light and cramped conditions, the damage site may be detected on the fast moving conveyor, e.g., 10-15 mph or more, but controlling the motion of the enormously heavy belt such that the damage site can be brought to a stop at a convenient repair station after a deceleration slowing down period is very difficult. The massive momentum of the belt, especially when loaded, prevents any rapid stopping of the belt and over running of the damage site beyond the repair station often dictates that more than one complete and time consuming lap of the long belt will be needed to bring the damage site again to a desired repair location where the heavy and specialized equipment for handling the belt is available.

Principal objects therefore, of the present invention are to provide a method and apparatus for monitoring damage or other event sites on a conveyor belt and controlling the running of the conveyor such that a spotted event site on the moving belt can be quickly brought to a desired repair location, whether inside or outside a mine or quarry or the like, and/or to provide a monitoring system for the location of splices (event sites) in the moving belt relative to the position of belt scrapers whereby the belt scraper pressure can be quickly but temporarily relaxed as the splice is moving by the scraper to avoid damage to the splice and/or scraper.

SUMMARY OF THE INVENTION

The above and other objects have been attained in accordance with the present invention, which in one of its preferred method embodiments is designed for facilitating the maintenance of long, heavy conveyor belts of conveyor systems and comprises the steps of (a) monitoring a conveyor belt for event sites (ESL), (b) spotting an event site and logging into computer means sufficient data from which the computer means determines and records the location of the event site (ESL) on the belt, and (c) using the recorded event site location data to control operational aspects of the conveyor system components, e.g., belt speed or belt scraper pressure which affect the maintenance or condition of said event site.

In another preferred embodiment the method comprises the steps of providing a conveyor structure having a continuous conveyor belt which is mounted on roller means mounted on base means of said structure, providing one or more counter means on said conveyor structure for measuring the distance traveled by one or more designated cycle points (CP) fixed in position on said belt, providing one or more reset means for resetting said counter means to zero each time a designated cycle point travels a measured cycle with respect to a designated fixed zero set point (ZSP) on said conveyor structure, spotting an event site (ES) in the travelling belt and immediately transmitting a "DBZ" reading (i.e., the distance the event site has traveled beyond a designated zero set point at the moment of spotting) to computer means which calculates the distance the event site has to travel to arrive at a designated repair station, and providing this data to an operator or an electronic motor controller such that the operator or motor controller can control the conveyor drive motor speed to stop said event site at said designated repair station.

In another and highly preferred embodiment, the aforesaid counter means provides a substantially continuous visual display of the remaining distance which the event site has to travel to reach the repair station, whereby an operator can readily determine when and how fast to decelerate the drive motor to stop the event site at the repair station.

BRIEF DESCRIPTION OF THE DRAWINGS

The invention will be further understood from the following description and drawings wherein:

FIG. 1 is a top down schematic and simplified view of a conveyor with portions of the top run of the belt removed to show the lower run as it might be viewed by a damage spotter or inspector;

FIG. 2 is a top view similar to FIG. 1 and showing an operable position for a zero set point (ZSP) device including its stationary zero set point component (sensor) 19 and its moving cycle point component (metal rivets or equivalent) 21 installed in edge of the conveyor belt;

FIG. 3 is a side view, partially broken away, taken along line 3—3 of FIG. 2 in the direction of the arrows;

FIG. 4 is a general layout of an operable electronic control system for carrying out the above described methods;

FIG. 5 is a plan view of a conveyor belt showing various aspects of the belt which can be monitored by the present invention;

FIG. 11 is a schematic of one embodiment of the use of a "DBZ" in bringing an event site (ES) to a selected repair station (RS); and FIG. 12 is a schematic of a conveyor showing a preferred method for calculating distances of travel of the event sites to repair stations.

DETAILED DESCRIPTION

Figure 8:
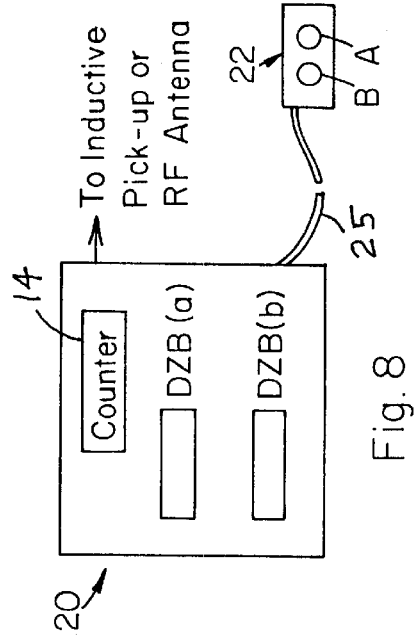
FIG. 8 is a schematic of a hand-held control system useful for carrying out the present invention.

Referring to the drawings and with particular reference to the claims hereof and to one preferred embodiment of the invention, the present invention is described in a method embodiment wherein a conveyor structure 9 having a long, continuous conveyor belt 10 with spliced together sections of substantial length and mounted on discharge end roller means 39 and drive roller means 41 which typically is mounted intermediate of the belt ends, is provided for transporting heavy materials 11 such as coal, ore, rock, minerals, product or the like at substantial speeds over long distances, wherein said belt is provided with one or more cycle point means (CP) 15 and with one or more zero set point means (ZSP) 16, wherein said (CP) and (ZP) when juxtaposed provide a counter reset signal, said method comprising the steps of (a) providing one or more repair stations (RS) 12 positioned along said belt in proximity thereto, (b) providing one or more counter means (C) 14 for substantially continuously determining and recording the distance traveled by one or more designated (CP's) 15 on said belt beyond one or more (ZP's) 16 fixed on a stationary portion such as base or frame member 13 of conveyor structure 9, (c) providing one or more reset means 18 for resetting one or more of said counter means to zero upon receiving a reset signal at each measured cycle which can be one or more complete or predetermined partial laps of belt 10, and (d) as in FIGS. 4 and 8, providing a control system 20 comprising transmitter means 22 for sending an event site signal (ESS) to a computer means 34 that an event site (ES) has been spotted at a particular (DBZ), distance beyond zero set point of spotter and the (ES) wherein said computer means is adapted to pick off, record and use the (DBZ) in a manner selected from the group consisting of (1) calculating the distance of the event site (ES) to the nearest or any desired forward repair station (RS) and signaling a controller for the drive motor 23 when and how fast to decelerate the belt to stop the event site at a selected forward repair station (RS) 12, and/or (2) substantially continuously calculating and displaying on a viewing screen the location of the event site with respect to a repair station such that maintenance personnel can see numerically the approach of the event site toward said repair station and manually or electronically control the drive motor to stop the belt and event site at said repair station.

As mentioned above, and particularly in coal mines, some conveyors are long and may be, for example, 7500 ft. from loading point (tail) to discharge. If a conveyor is 7500 ft. long, it will have 15,000 ft. of belt. This belt will be put on the conveyor in about 1000-ft. lengths which means there will be 15 splices make the belt continuous. The splices can be of a mechanical type (MS) or vulcanized type (VS), but either type is a relatively weak link and subject to damage and wear and must be remade from time to time.

To locate old, worn or damaged splices or damaged areas, a visual inspection is typically required. An "inspector" or "spotter" will watch the belt to see if a new splice, for example, needs to be made. If such is required the spotter will tell the maintenance crew that the splice will be arriving at the repair station in, e.g., a few minutes, however, with present technology he cannot tell them where the splice location is in the belt with any practical degree of accuracy. Consequently, the splice often passes beyond the repair station before it is noticed in time to decelerate and stop the belt.

The present method establishes one or more reference points, i.e., stationary zero set points (ZSP) on, for example, the frame or base of the conveyor apparatus, and one or more travelling cycle points (CP) on the conveyor belt. These points in cooperation as described in detail below, allow event sites to be accurately located on the moving belt and to be found again very quickly. In operation, the conjunction of these (ZSP) and (CP) establishes the starting point for measuring the belt travel distance from the zero set point on the conveyor structure and can be established by means of a variety of sensing devices such as capacitive or radiation sensors, radio frequency devices, photo cell devices, or the like, but an inductive pick-up or radio frequency device is presently preferred such as Escort Memory System's RFID model LRP 820. For example, when a piece of metal goes by an inductive pick-up, a signal will be sent to a PC (programmable computer). This signal will cause the PC to reset a counter means which is counting, e.g., in seconds or feet. With a radio frequency device, a tag is put into the conveyor belt as the cycle point and an antenna is stationarily positioned on the conveyor structure so that as the tag goes under the antenna a circuit is charged in the tag allowing the tag to send a zero set point signal back to the antenna and to a reset means to reset the counter to zero or other equivalent initial value.

As an example and referring further to FIG. 8, a counter 14 which can read in time and/or distance, e.g., seconds or feet is reset to the zero set point of the counter, i.e., (ZSP) when the (PC) gets a signal from the inductive pick-up or the RF antenna. Then as an event site is spotted, the inspector will use the push buttons A and/or B on remote control or transmitter means 22 to log in and hold the reading (DBZ) of the counter (C) when he sees a damaged splice which requires attention. Control system 22 can be electrically connected by cord 25 of any length to counter 14, or 22 can be a cordless wave signal transmitter whereby 22 can be held in an inspector's hand. For example, when the inspector pushes button A, the counter reading (CR), i.e., (DBZ) will be logged in and held on (DBZ)(a). If the inspector sees another event site, he will push button B to log the counter reading of (DBZ)(b), and so on.

In regard to the (DBZ) reading, the inspector and his hand held control means 22 may be non-stationary and may move along the belt from and to any location convenient to the inspector. Then when the inspector sends a (DBZ) signal to the computer, the signal automatically or manually by the inspector includes the location of his hand held control means 22 along the conveyor. This variable position of 22 along the conveyor may be continually or periodically established by, for example, a radar or sonar or the like type communication between the stationary zero set point on the conveyor structure and the present location of the inspector and control means 22. Also, yard markers or the like along the length of the conveyor can be transmitted by the spotter along with the event site signal.

It is noted that since the counter of distance and/or time can be reset to zero at the terminus of a designated belt cycle distance, a reference point for calculating distances to be traveled by any event site to any location along the conveyor is established.

Figure 9:
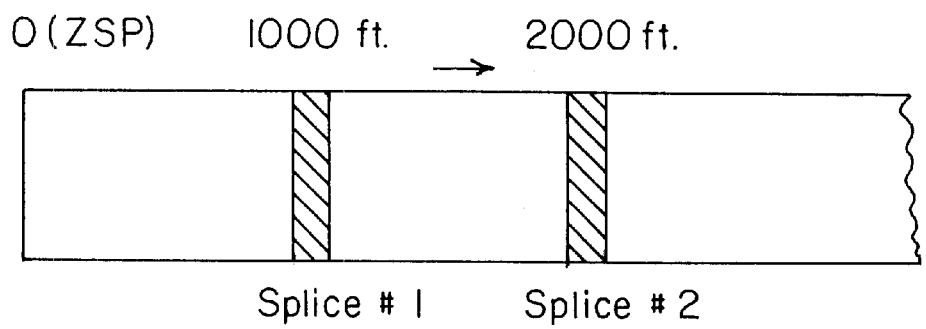
FIG. 9 is a schematic of a typical belt showing two visually displayed and/or computer mapped splices travelling toward a zero set point (ZSP)

Some other benefits of the present invention as shown in FIG. 9 include mapping the splices and other event sites of the belt and recording their (DBZ's) and other information on the event site, such as splice age, into computer means such that maintenance crews will have visual displays or other retrievable histories of splices or the like. The inspector and crews can use the map to know when the next splice or other event site of the belt is coming up toward a repair station in accordance with the present invention.

It is particularly noted that any number of counter means, reset means, cycle points on the belt and/or zero set points on stationary portions of the conveyor may be employed in order to provide any desired number and measures of cycles, as well as providing any number of repair stations. Such a multi-functional cycling system, if properly computer controlled, with of course, the assistance of inspectors or spotters, could reduce the travel time of event sites from their point of occurrence to a most proximate repair station. The computer system also is able to by-pass any of the additional zero set points or cycle points if their use for a particular conveyor installation or mining operation would not be appropriate.

Figure 10:
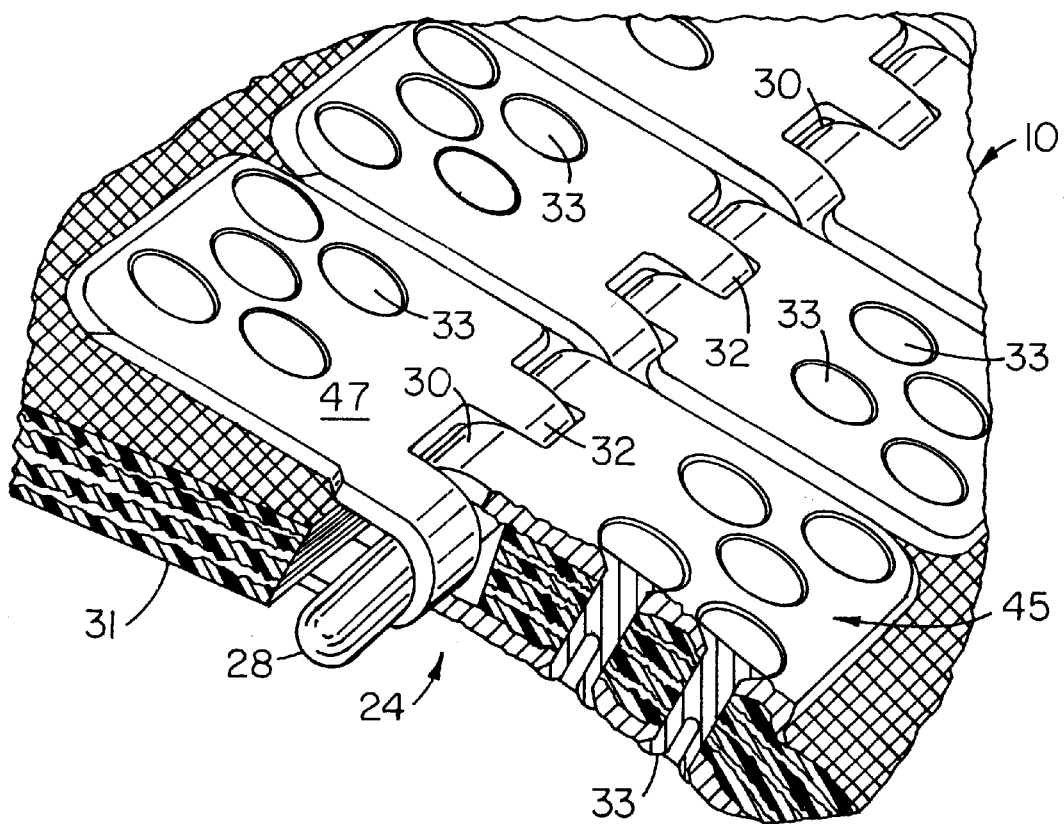
FIG. 10 is an isometric view of a portion of a heavy duty underground mining conveyor belt with a riveted hinge and marketed under the tradename FLEXCO®.

Referring particularly to FIGS. 1 and 10, belt 10 of, e.g., steel belted rubber 31 or the like, which may be up to three miles or more in total length and mounted on conveyor rollers within a mine is made up of several sections which are hinged together by splices such heavy metal splices 24 and 26 having steel halves 45,47 affixed to adjacent belt section ends by riveting 33 or the like and held together by hinge pins 28 mounted thru mating hinge bearings 30, 32 on the splice halves. Other splices are often used such as layered vulcanized rubber.

As often happens, a splice such as 24 will become damaged through, for example, breaking of the hinge pin 28 as shown in FIG. 1. Without early replacement of this pin, the entire conveyor system could be shut down if the pin further broke or if other damage resulted from the partial break, such as tearing away of the hinge halves from the belt sections. Other damage often experienced is tearing of holes or splits in the belt, partial ripping of vulcanized splices, or the like, all of which are event sites.

In carrying out a preferred embodiment of the present method, with reference to FIG. 1, one or more repair stations 12 are located along the conveyor within and/or outside the mine. These stations can be fixed in location or can be moved, and increased or decreased in number depending on the conveyor maintenance needs dictated by mining conditions and mining operation strategy, or the like. It is noted that the event site can be spotted and the repair made either on the top run 35 or lower run 37 of the belt. Where the repair is to be made to the top run, the event site area would typically be cleared of material being transported.

An operator or spotter is provided preferably with a transmitter means such as 22 for sending a signal or data to a computer means 34 indicating that at that time, and at that reading of counter (C), and at that location along the conveyor an event site (ES) 36 in the belt has been spotted. The computer means, which will already have recorded the (DBZ), i.e., location of spotter data up to that point, can display or otherwise use the data. Upon resetting of counter (C) to zero, a display of the counter readings from zero to a repair station or to a scraper, or a display of the diminishing distance of the event site to a repair station in, e.g., feet or yards or time can then be used by maintenance personnel to keep track of the event site as the belt moves thru a measured cycle, e.g., a full or partial lap of the belt. Then, as the event site approaches a repair station, an operator can control either manually or electronically the drive motor to stop the belt and event site at the repair station. It is preferred to have the maximum (DBZ) as one full cycle, i.e., one lap of the belt, however, there may be situations where, e.g., two or more laps or a partial lap would be desired.

In another preferred embodiment wherein the spotter stations and repair stations are at the same locations, the computer means 34 which will have recorded the (DBZ) data and also the present locations of all repair stations, can immediately calculate the distance in either linear measurement or time from the event site to the next or any other desired forward repair station 12. The computer can then also immediately calculate the belt deceleration needed and signal the drive motor controller to stop the event site at a desired repair station.

Referring to FIGS. 2 and 3 which show one way that the zero set point can be established for both mechanical (MS) and vulcanized (VS) splices, the sensors 19 and 27 are stationary on the conveyor frame or other stationary structure thereof, and the rivets 21 represent a cycle point 15 which moves with the belt and resets the counter (C) to zero when said rivets pass by sensor 19. Both sensors 19 and 27 will read when metallic mechanical splices (MS) come by since they span both sensors. However, only the one sensor 19 positioned over the rivets 21 will read when the rivets go by. If both 19 and 27 read, the counter will not reset to zero. When sensor 19 reads and sensor 27 does not, the counter will reset to zero. The sensor can be any of a large variety of industrial devices such as those sensitive to electromagnetic, infrared, or ultraviolet radiation, or to changes in voltage, current or electrical resistance such as to generate a transmittable signal.

Referring to FIG. 4, push buttons 1, 2 and 3 of transmitter means 22 selectively lock in the event site (DBZ) readings of the continuously reading counter (C), i.e., into the three displays (a), (b) and (c) respectively. Counter (C) runs all the time and is set to zero, i.e., the zero set point (ZSP) when rivets 21 pass sensor 19. These displays will hold the DBZ readings of counter (C) when their associated buttons are pushed, however, these displays are preferably controlled to show a diminishing progression from the (DBZ) measure to a zero value or equivalent at the next selected repair station. As shown, for example, in FIG. 11, the distance of a spotted or mapped event site (ES) to a (RS) is substantially the length of dotted line 29. This measure is obtained by subtracting the distance of the (ZSP) to the (DBZ) from the total distance of the (ZSP) to the (RS). It is preferred that the length of 29 be displayed to the maintenance personnel as a progressively diminishing number, e.g., 1100 ft., down to zero ft., as the event site moves toward the (RS).

Referring to FIG. 12 and in further explanation of one method of calculation, when the event site location (ESL) spotting signal is sent to the computer, the computer already has or simultaneously receives the cycle point location (CPL) which is the (CP) or rivet 21 distance beyond the (ZSP) on the belt from (C). The lag distance (LD) of the (DBZ) and (ESL) from the (CPL) is calculated and logged into the computer. Then when (C) is reset to zero by the conjunction of the rivets 21 and sensor 19, the (LD) is added to the known distance (RSBZ) of the (RS) beyond the (ZSP) such that the computer can numerically show maintenance personnel what counter (C) reading (CR) will place the (ES) at the (RS).

| | |
|---|---|
| CPL = 3,000' | |
| BDZ = 1,500' | CR = RSBZ + LD |
| LD = 1,500' | CR = 300' + 1,500' = 1,800' |
| RSBZ = 300' | |

Figure 6:
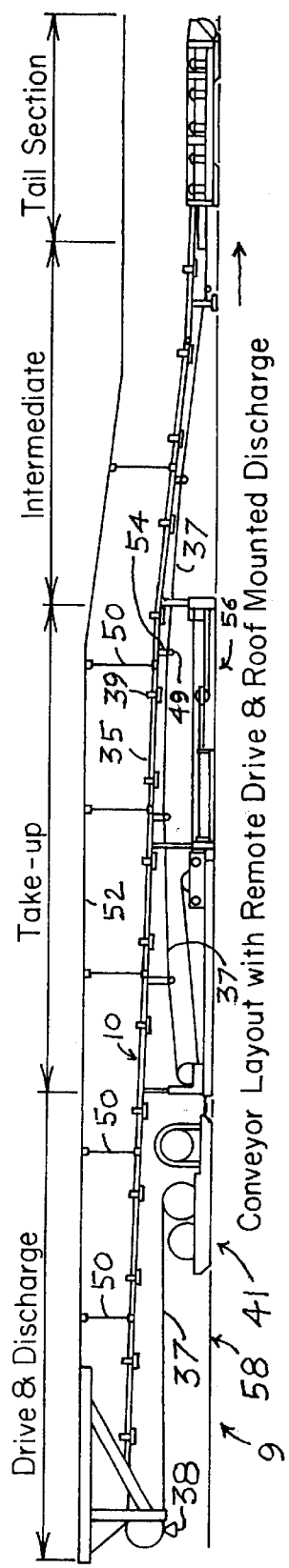
FIG. 6 is a side view schematic of a typical coal mine conveyor system to which the present invention can be adapted.
Figure 7:
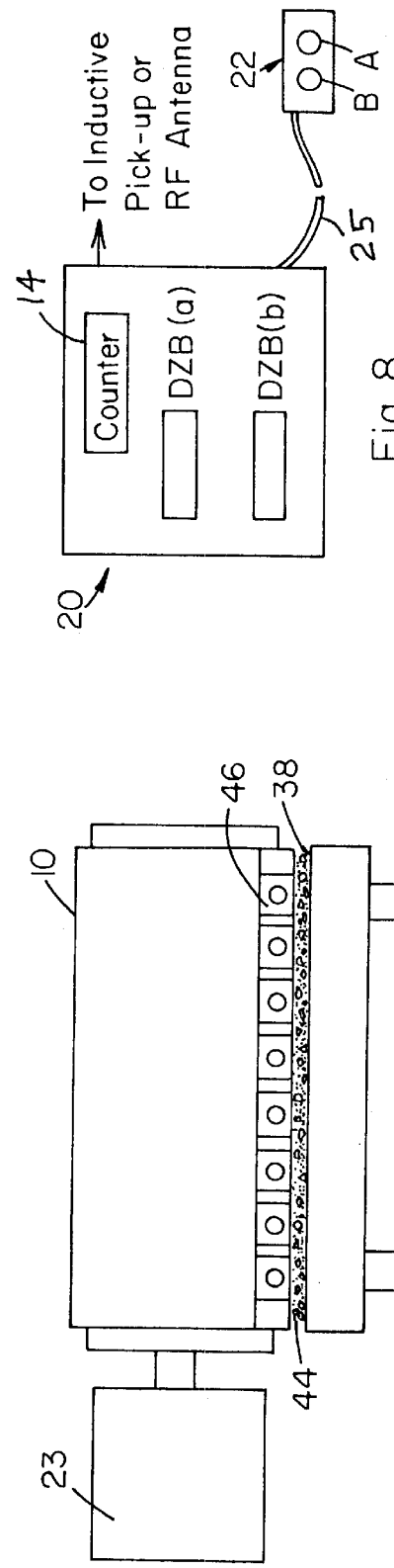
FIG. 7 is discharge end view of a conveyor showing a hydraulically operated scraper blade in the retracted position away from a riveted splice.

Referring to FIGS. 6 and 7 and only as background information for assisting in understanding the present invention, a typical coal mine conveyor structure 9 of considerable length is shown wherein the rails e.g., wire ropes or beams which support the rollers 39 of the coal discharge run (top) 35 of the belt 10 are suspended by hangers 50 such as steel rods, chain, cable, or the like which are affixed to the mine roof 52. The return (lower) run 37 of the belt typically is carried on rollers 49 supported by drop brackets 54 suspended from the aforesaid rails. The drive unit 41 and belt take up unit 56 are mounted on the mine floor 58. Further details of well known structures of such conveyors is given, for example, in the accompanying copy of the Dec. 1987 brochure of Continental Conveyor & Equipment Company, Inc. of Winfield, Alabama, entitled "Belt Conveyor Systems for Mining and Construction Industries", thirty seven pages.

A typical scraper blade 38 is mounted on pistons 40 and 42 of hydraulic cylinders, e.g., double acting, such that an electronic signal received by electronically controlled hydraulic fluid valves 43 can actuate the pistons to either force the blade against the belt 10 to remove "carry back" material 44 therefrom. In accordance with the present invention, the splice 46 which is a spotted event site, will be avoided by blade 38 which will be retracted as shown, just long enough to allow the splice to move beyond it. Again, the retraction and reengagement of blade 38 by operation of the hydraulic valves 42 can be done automatically from mapped data logged into computer means or by manual operation of the valves by an operator.

This invention has been described in detail with particular reference to preferred embodiments thereof, but it will be understood that variations and modifications will be effected within the spirit and scope of the invention. location where the heavy and specialized equipment for handling the belt is available.

I claim:

1. The method for facilitating the maintenance of a conveyor structure having a long and heavy duty moving conveyor belt mounted on roller means which are mounted on base means, wherein the belt is driven by drive motor means, comprising the steps of establishing one or more stationary zero set points on said structure, providing one or more cycle points on said belt, each marking the terminus of a designated travel distance of said belt, providing counter means on said conveyor structure for measuring the distance traveled by any of said cycle points on the belt beyond one or more designated set points, providing one or more work stations along and in proximity to said belt, and providing reset means for resetting said counter means to a desired starting value when a designated cycle point arrives at a designated set point, spotting one or more event sites on said belt, transmitting a signal to a computer means that an event site has been spotted, said computer means being provided with data sufficient to determine the distance which said spotted event site must travel to a forward work station, and operating the computer means either to signal an operator to control, or to itself control an aspect of the operation of said conveyor structure for enhancing the maintenance of said belt.

2. The method of claim 1 wherein said one or more work stations comprises belt scraper means normally urged into engagement with said belt, and said aspect comprises retracting said scraper means from its operative scraping position against said belt for the period of time that an event site is contiguous said scraper.

3. The method of claim 1 wherein said one or more workstations comprises a belt repair station, and said aspect comprises decelerating said belt at a rate to stop the spotted event site at said repair station.

4. The method of claim 3 wherein said spotting is performed visually by an operator who transmits an electronic signal by a hand held transmitter to a receiver of a computer means which pin points the location of the operator, wherein said computer means calculates the distance of the operators location to said repair station, and wherein said computer means then calculates what deceleration of the belt is necessary to stop the belt at said repair station, and then transmits a signal to a motor controller means associated with the drive motor to so decelerate and stop the belt.

5. A material conveyor structure having a continuous, long and heavy conveyor belt having spliced sections and being roller mounted on frame means of said conveyor structure, one or more counter means on said structure for measuring the distance traveled by said belt, one or more fixed zero set point means on said conveyor structure, one or more designated cycle point means fixed in linearly spaced locations on said belt, one or more reset means for resetting said counter means to zero each time a selected cycle point travels a measured cycle with respect to a fixed zero point means, one or more work stations positioned along said structure in proximity thereto, means for spotting an event site in the travelling belt and immediately transmitting to computer means the distance which said event site has traveled beyond a zero set point means, said computer means being adapted to calculate the distance the event site has to travel to arrive at a selected work station, and means for providing this distance data to an operator or to electronically operated equipment to control an aspect of the operation of said conveyor structure for enhancing maintenance of said belt or other components of said conveyor structure.

6. The conveyor structure of claim 5 wherein said one or more work stations comprises belt scraper means having a blade normally urged into engagement with said belt and having power means for retracting said blade from its operative scraping position against said belt for the period of time that an event site is contiguous said blade.

7. The conveyor structure of claim 5 wherein said one or more work stations comprises a belt repair station, and said aspect comprises decelerating said belt at a rate to stop the spotted event site at said repair station.

* * * * *